(12) United States Patent
Bodas et al.

(10) Patent No.: US 7,788,670 B2
(45) Date of Patent: Aug. 31, 2010

(54) PERFORMANCE-BASED WORKLOAD SCHEDULING IN MULTI-CORE ARCHITECTURES

(75) Inventors: Devadatta V. Bodas, Federal Way, WA (US); Jun Nakajima, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 1707 days.

(21) Appl. No.: 10/973,707

(22) Filed: Oct. 26, 2004

(65) Prior Publication Data

US 2006/0090161 A1  Apr. 27, 2006

(51) Int. Cl.
G06F 9/46 (2006.01)
G06F 15/00 (2006.01)
G06F 1/00 (2006.01)

(52) U.S. Cl. .............. 718/105; 718/100; 718/104; 712/28; 712/203; 713/322

(58) Field of Classification Search ............ 718/100, 718/102, 104, 108, 105, 1, 101, 103; 709/223–226; 713/300, 500–502, 320, 310, 322; 703/22; 702/182; 712/11, 12, 28, 32, 203

See application file for complete search history.

(56) References Cited

U.S. PATENT DOCUMENTS

| | | | | |
|---|---|---|---|---|
| 4,748,558 A * | 5/1988 | Hirosawa et al. | ............ | 718/105 |
| 5,522,070 A * | 5/1996 | Sumimoto | ................. | 718/104 |
| 5,913,068 A * | 6/1999 | Matoba | ........................ | 713/322 |
| 6,067,412 A * | 5/2000 | Blake et al. | ................. | 718/102 |
| 6,418,517 B1 * | 7/2002 | McKenney et al. | ......... | 711/151 |
| 6,457,135 B1 * | 9/2002 | Cooper | ........................ | 713/323 |
| 6,711,447 B1 * | 3/2004 | Saeed | .......................... | 700/82 |
| 6,823,516 B1 * | 11/2004 | Cooper | ....................... | 718/108 |
| 7,065,641 B2 * | 6/2006 | Schelling | ........................ | 713/2 |
| 7,065,764 B1 * | 6/2006 | Prael et al. | .................. | 718/102 |
| 7,093,147 B2 * | 8/2006 | Farkas et al. | ................ | 713/320 |
| 7,146,514 B2 * | 12/2006 | Kaushik et al. | ............. | 713/322 |
| 7,448,037 B2 * | 11/2008 | Arimilli et al. | ............. | 718/104 |
| 7,596,788 B1 * | 9/2009 | Shpigelman | ................ | 718/100 |
| 2002/0198924 A1 * | 12/2002 | Akashi et al. | ............... | 709/102 |
| 2003/0065702 A1 * | 4/2003 | Singh et al. | ................. | 709/105 |
| 2003/0079151 A1 * | 4/2003 | Bohrer et al. | ............... | 713/320 |
| 2003/0088610 A1 * | 5/2003 | Kohn et al. | ................. | 709/107 |
| 2003/0217297 A1 * | 11/2003 | Gschwind et al. | ........... | 713/300 |

(Continued)

OTHER PUBLICATIONS

Author Deva Bodas, "New Server Power-Management Technologies Address Power and Cooling Challenges", Technology@Intel Magazine, Sep. 2003, p. 1-5, Intel Corporation.*

(Continued)

*Primary Examiner*—Meng-Ai An
*Assistant Examiner*—Abdullah Al Kawsar
(74) *Attorney, Agent, or Firm*—Kacvinsky Daisak PLLC

(57) ABSTRACT

Systems and methods of managing workloads provide for detecting a workload for a system having a first processor core with a first performance indicator and a second processor core with a second performance indicator. The workload is scheduled based on the first and second performance indicator settings. In one embodiment, a performance feasibility index is calculated for each core based on the core's frequency setting and utilization and the workload is assigned to the core associated with the highest index.

24 Claims, 4 Drawing Sheets

U.S. PATENT DOCUMENTS

2005/0071843 A1* 3/2005 Guo et al. .................. 718/101
2005/0223382 A1* 10/2005 Lippett ....................... 718/103
2006/0026447 A1* 2/2006 Naveh et al. ................ 713/322
2006/0037024 A1* 2/2006 Bodas ........................ 718/105

OTHER PUBLICATIONS

Author Deva Bodas, "New Server Power-Management Technologies Address Power and Cooling Challenges", Technology@Intel Magazine, Sep. 2003, p. 1-6, Intel Corporation.

* cited by examiner

PERFORMANCE-BASED WORKLOAD SCHEDULING IN MULTI-CORE ARCHITECTURES

BACKGROUND

1. Technical Field

One or more embodiments of the present invention generally relate to scheduling workloads in processors. In particular, embodiments relate to the scheduling of workloads in architectures based on performance indicators.

2. Discussion

Certain modern day computer systems make use of multiple processor packages, where each package plugs into a corresponding socket, has a fully functional processor core, and is often referred to simply as a "processor". When presented with new tasks to schedule, the conventional approach has been to schedule the tasks on whichever processor is the least busy. Thus, the processor that is being utilized the least, typically receives and executes the instructions associated with the new tasks. As computer system architectures continue to evolve, however, strictly utilization-based scheduling may be unsatisfactory from a performance standpoint as well as a power consumption standpoint.

For example, smaller enclosures, denser transistor arrays and faster processor speeds have led to the use of advanced power saving techniques to conserve power, control temperatures and extend battery life (in the case of mobile platforms). These techniques can involve demand based switching (DBS), which scales the frequency of a processor up or down in order to tradeoff performance for power conservation. Accordingly, it may be increasingly more common for different processors in a system to be operating at different speeds at any given moment. Because operating frequency is often a resource setting that is shared by components other than the processor in question (i.e., resource dependencies may exist), a situation may arise wherein a processor is scaled to a relatively high operating frequency but is not the least utilized processor in the system.

Consider, for example, a dual-core processor with a shared frequency setting, where one of the cores (e.g., "Core1") is much more utilized than the other core (e.g., "Core2"). In this example, because Core1 is highly utilized, it will be run at a high frequency in order to satisfy the higher demand for the compute workload. Core2 will also be run at the high frequency because the frequency setting is shared by the two cores. Such would be the case even though Core2 has a low demand for the compute workload and ideally should be run at a lower frequency to save or reduce power consumption. In the case of a multi-core, multi-processor system, the result may be one or more low frequency cores running a great number of tasks while at the same time high frequency cores are running few tasks.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
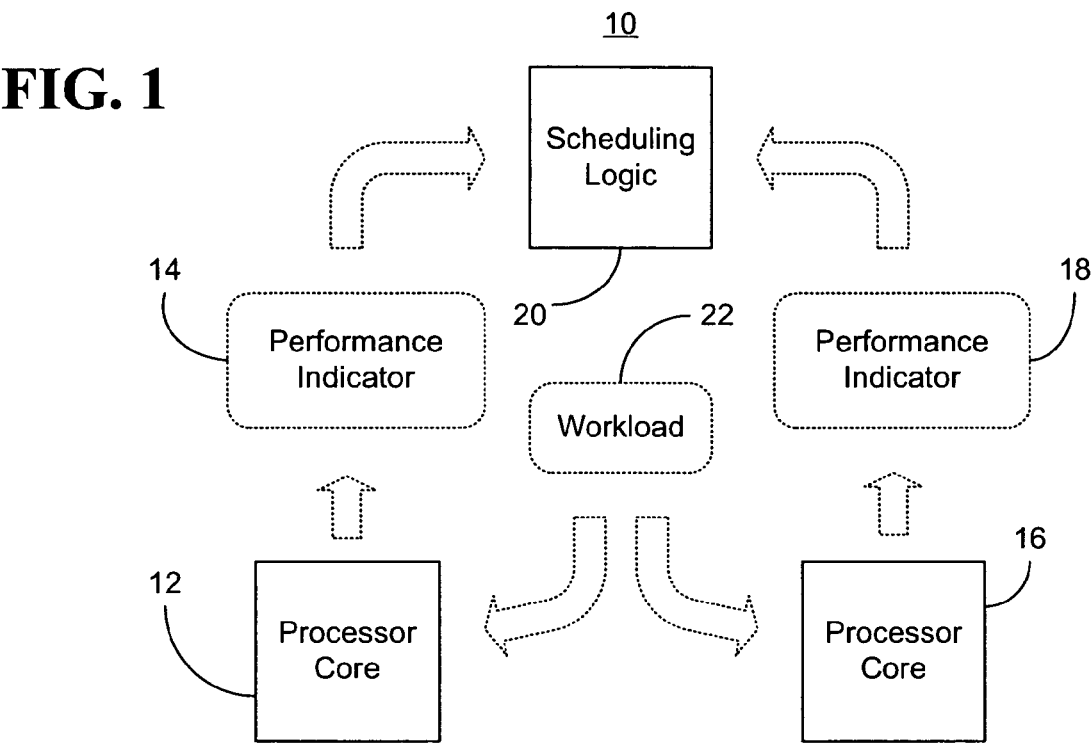
FIG. 1 is a block diagram of an example of a processing architecture according to one embodiment of the invention.

FIG. 1 shows a processing architecture 10 in which a first processor core 12 has a first performance indicator 14 and a second processor core 16 has a second performance indicator 18. In one embodiment, the performance indicators 14, 18 can include performance state (P-state) frequency settings as described in the Advanced Configuration and Power Interface Specification (e.g., ACPI Specification, Rev. 3.0, Sep. 2, 2004; Rev. 2.0c, Aug. 25, 2003; Rev. 2.0, Jul. 27, 2000, etc.), where higher frequencies generally provide greater performance and lower frequencies (and lower core voltages) can enable greater power savings. The performance indicators 14, 18 could also include other indicators of performance such as cache size, amount of parallelism, and so on.

The cores 12, 16 can be fully functional with dedicated instruction fetch units, arithmetic logic units (ALUs), floating point units, reorder buffers (ROBS), level one (L1) caches, etc., and may be similar to the core of the Pentium® 4 processor from Intel® Corporation, in Santa Clara, Calif. The cores 12, 16 could also be located on separate processors or the same processor. In addition, each core 12, 16 may be part of a separate multi-core processor, where the first performance indicator 14 could be shared by a first plurality of cores and components (not shown) or dedicated to the first processor core 12, and the second performance indicator 18 is shared by a second plurality of cores and components (not shown) or dedicated to the second processor core 16. While certain examples will be described with regard to multi-core, multi-processor architectures, other structures can be used without parting from the spirit and scope of the embodiments. Indeed, any architecture in which performance and power are issues of concern can benefit from the principles described herein. Notwithstanding, there are a number of aspects of multi-core, multi-processor architectures for which one or more embodiments are well suited.

The illustrated architecture 10 also has scheduling logic 20, which is capable of detecting a workload 22 for the architecture 10 and scheduling the workload 22 based on the performance indicators 14, 18. The workload 22 may include one or more tasks associated with a thread, process, application, etc., or any combination thereof. Although workload scheduling is typically performed by software such as an operating system (OS) module, one or more portions of the scheduling logic 20 may be implemented in fixed functionality hardware, microcode, software, etc., or any combination thereof. Furthermore, although the scheduling logic 20 is illustrated in a single block, various components of the scheduling logic 20 may be distributed throughout the architecture 10 depending upon the circumstances. By scheduling the workload 22 based on performance indicators such as frequency, as opposed to mere utilization, the scheduling logic 20 is able to provide a number of unique advantages over conventional approaches.

Figure 2A:
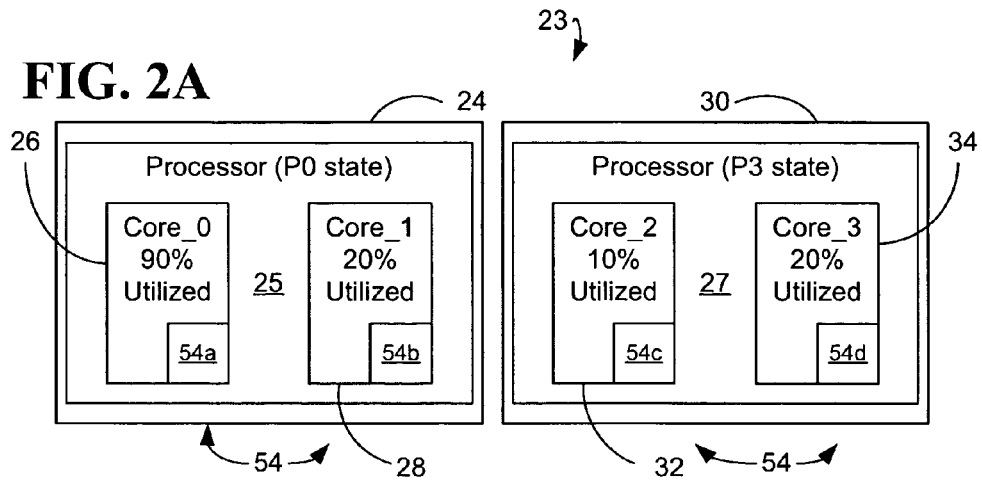
FIG. 2A is a diagram of an example of a system before an additional workload is scheduled according to one embodiment of the invention.

FIG. 2A shows a particular example of a computing system 23 in which a multi-core, multi-processor architecture is used. The system 23 could be part of a server, desktop personal computer (PC), notebook PC, wireless phone, personal digital assistant (PDA), and so on. The illustrated system 23 has a pair of processors 25, 27, where the processors 25, 27, may be coupled to a circuit board (not shown) by way of a pair of sockets 24, 30. Alternatively, the processors 25, 27 may be hardwired directly to the adjacent circuit board. In the illustrated example, a first socket 24 is coupled to a first multi-core processor 25, where the first multi-core processor 25 includes first and second cores 26 and 28 ("Core_0" and "Core_1", respectively). A second socket 30 is coupled to a second multi-core processor 27, where the second multi-core processor 27 includes third and fourth cores 32 and 34 ("Core_2" and "Core_3", respectively). The system is shown as being in a state where the first core 26 is 90% utilized, the second core 28 is 20% utilized, the third core 32 is 10% utilized and the fourth core 34 is 20% utilized. Thus, there is a relatively wide disparity between the utilization of the fist core 26 and the second core 28, whereas the third core 32 and the fourth core 34 have similar utilization levels. If the processors 25, 27 are using P-states, the available frequencies of the cores might be given by a table such as the following Table I.

TABLE I

| State | Frequency | Power | Utilization |
|---|---|---|---|
| P0 | 3.6 GHz | 90 W | >86% |
| P1 | 3.2 GHz | 75 W | 80-85 |
| P2 | 2.8 GHz | 55 W | 67-79 |
| P3 | 2.4 GHz | 40 W | <67 |

Thus, the optimal P-states for the cores 26, 28, 32 and 34 might be P0, P3, P3 and P3 (i.e., 3.6 GHz, 2.4 GHz, 2.4 GHz, 2.4 GHz), respectively. If the clock frequency is a shared resource per-processor, however, a "common denominator" of 3.6 GHz could be selected for the first and second cores 26, 28 on the processor 25. A frequency of 2.4 GHz could be selected for the third and fourth cores 32, 34 on processor 27. It should be noted that the specific P-states, frequencies, power levels and utilization percentages used herein are provided to facilitate discussion only. Accordingly, other values may be used without parting from the spirit and scope of the embodiments described.

Figure 2B:
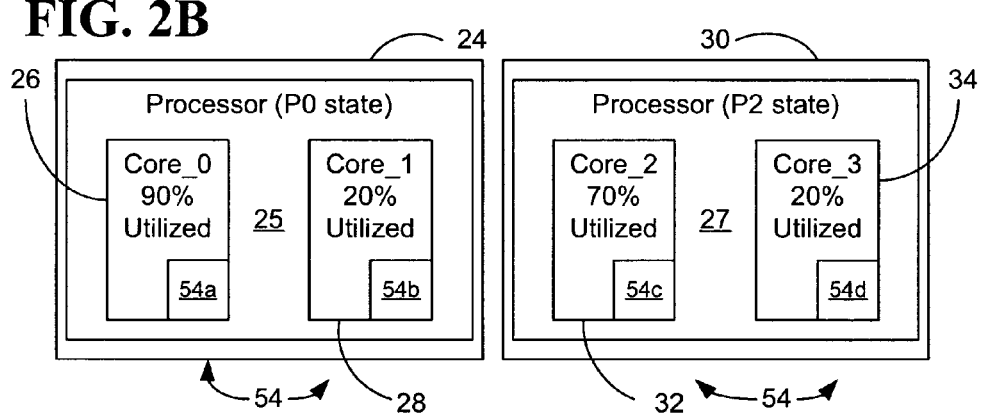
FIG. 2B is a diagram of an example of a system after an additional workload is scheduled according to an approach that is limited to utilization data.

FIG. 2B shows that under an approach limited to utilization-based scheduling, the performance indicators would be ignored and the additional workload would be assigned to the third core 32 (i.e., the least utilized core) of the second processor 27. Specifically, the system would result in a state where the first core 26 is 90% utilized, the second core 28 is 20% utilized, the third core 32 is 70% utilized and the fourth core 34 is 20% utilized. Accordingly, the processor 27 may need to transition to the P2 state in order to support the 70% utilization of the third core 32. The higher P-state and operating frequency would likely lead to greater power consumption for the second processor 27. Meanwhile, the second core 28 would be running at 20% utilization and at the highest possible frequency. Such a condition can be wasteful of processing resources.

Figure 2C:
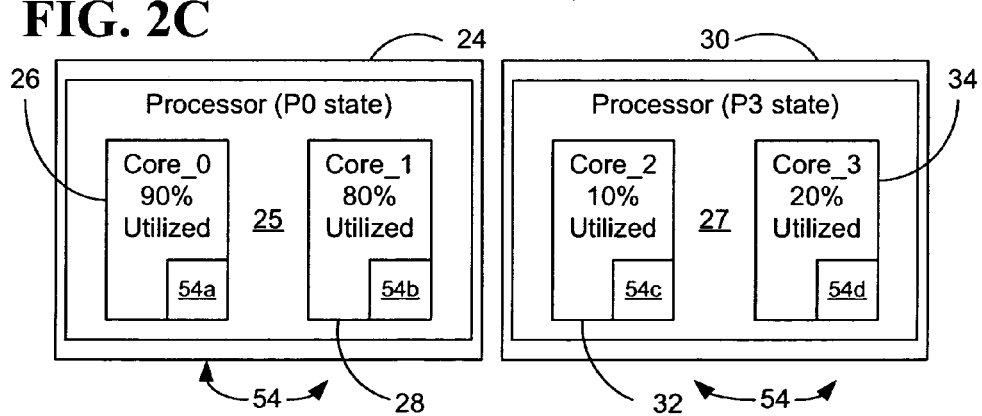
FIG. 2C is a diagram of an example of a system after an additional workload is scheduled according to one embodiment of the invention.

FIG. 2C demonstrates, on the other hand, that the additional workload can be assigned to a core that has both the capacity to handle the workload as well as a higher operating frequency. In particular, the workload can be assigned to the second core 28 of the first processor 25. As a result, the new workload will benefit from the higher performance associated with the higher operating frequency. Indeed, the level of performance that can be obtained from the operating frequency of the second core 28 in the illustrated example is greater than that of the third core 32 while in either the P3 state or the P2 state. In addition to these performance advantages, overall power may be lower because the second and third cores 32, 34 on the second processor 27 could be permitted to remain at their current P-state, P3. Accordingly, the overall architecture may experience an increase in performance as well as improved power conservation.

Figure 3:
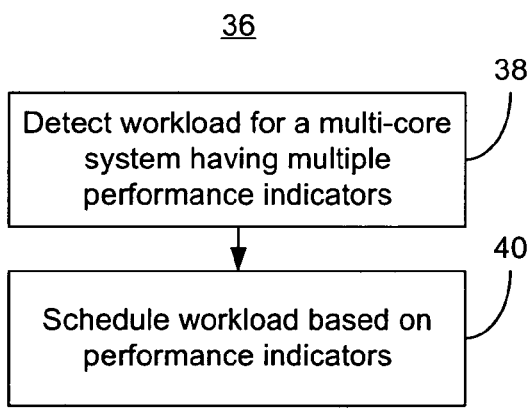
FIG. 3 is a flowchart of an example of a method of managing a workload according to one embodiment of the invention.

Turning now to FIG. 3, a method 36 of managing a workload is shown. The method 36 may be implemented in a processing architecture as fixed functionality hardware, microcode, software, etc., or any combination thereof. Processing block 38 provides for detecting a workload for a system having a first processor core with a first performance indicator and a second processor core with a second performance indicator. The performance indicators may have corresponding power, voltage and/or frequency settings as in the case of ACPI P-state settings. The performance indicators may also include information regarding cache size, amount of parallelism, etc. For example, a larger level one (L1) or level two (L2) cache could be an indicator of greater performance capacity for a given processor core. In addition, cores with the ability to run a greater number of simultaneous threads may also have a greater performance capacity due to more parallelism. The workload is scheduled at block 40 based on the first and second performance indicators. As already noted, taking performance indicators into consideration when scheduling workloads enables performance to be maximized and may lead to reduced power consumption.

Figure 4:
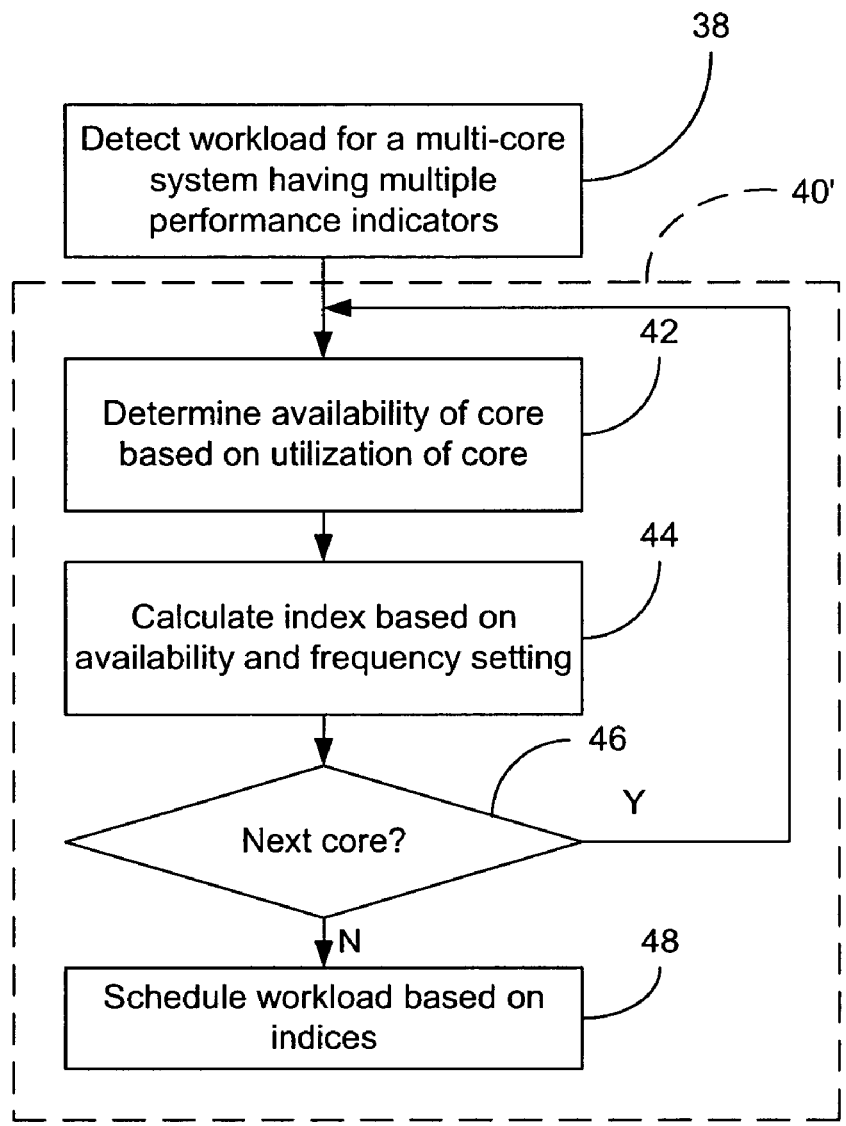
FIG. 4 is a flowchart of an example of a process of scheduling a workload according to one embodiment of the invention.

FIG. 4 shows one approach to scheduling a workload based on performance indicators in greater detail at block 40'. In particular, the illustrated block 42 provides for determining an availability of a core based on a utilization of the core. A performance feasibility index is calculated at block 44 based on the availability and a frequency setting of the core. Thus, in the illustrated example, the performance indicator is a frequency setting. Block 46 provides for determining whether another core exists, and if so, the determining and calculating in blocks 42 and 44 are repeated. Otherwise, the workload is scheduled at block 48 based on the indices.

Figure 5:
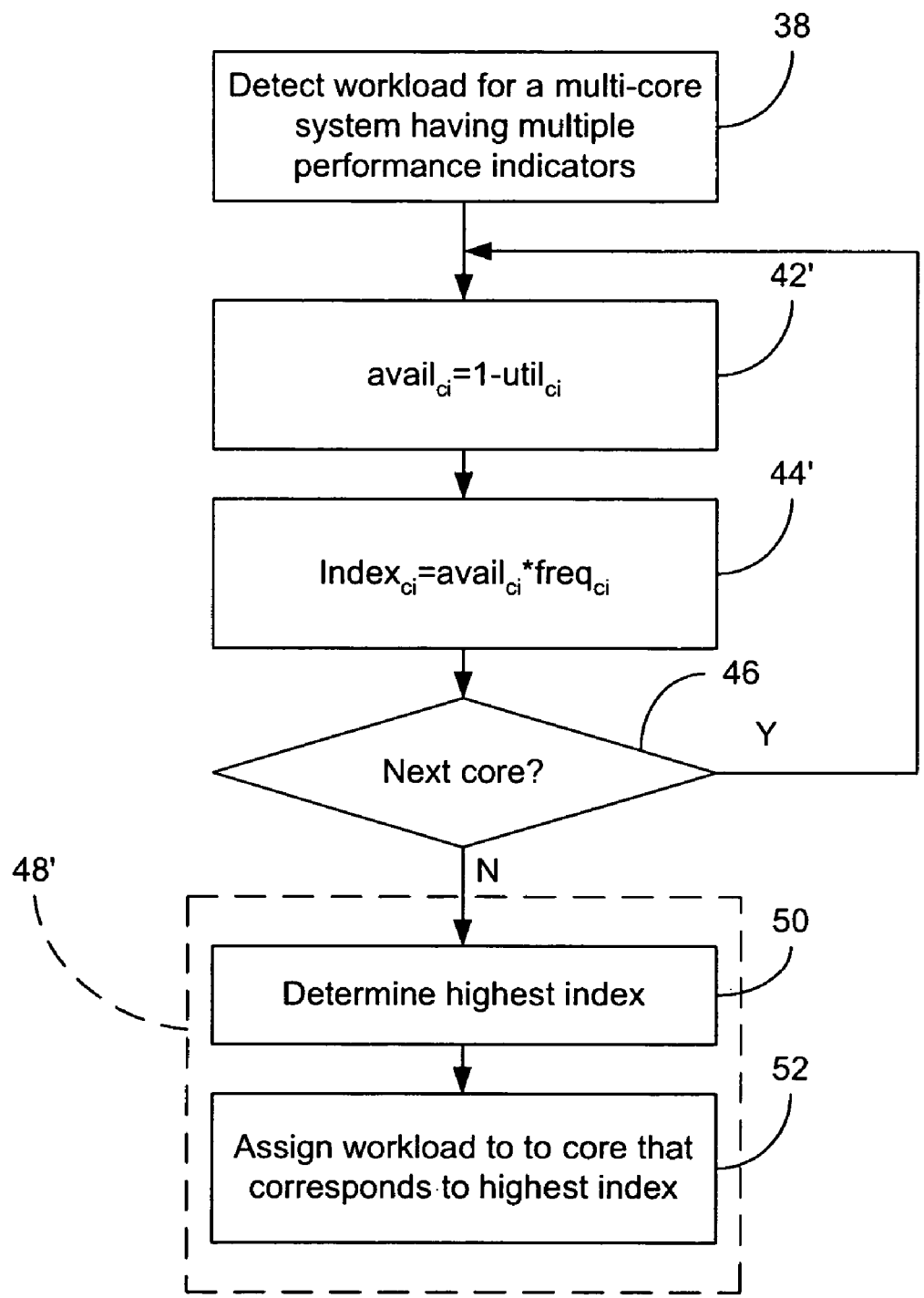
FIG. 5 is a flowchart of an example of a process of determining an availability of a core, calculating an index and scheduling a workload according to one embodiment of the invention.

Turning now to FIG. 5, one approach to scheduling a workload based on a plurality of indices is shown in greater detail. In particular, the availability is determined at block 42' by subtracting the utilization of the core in question from 1.0 according to the equation, $$\text{avail}_{ci} = 1 - \text{util}_{ci} \qquad \text{Equation I.}$$

Where $\text{util}_{ci}$ represents the utilized processor time of the core in question and $\text{avail}_{ci}$ represents the available processor time of the core in question. Thus, the availability can be effectively defined as the percentage of time in which the processor core is not utilized to execute instructions for applications, operating systems, etc. Block 44' provides for multiplying the availability of the core in question by the frequency setting of the core in question to obtain a performance feasibility index according to the equation, $$\text{Index}_{ci} = \text{avail}_{ci} * \text{freq}_{ci} \qquad \text{Equation II.}$$

Where $\text{Index}_{ci}$ represents the performance feasibility index of the core in question and $\text{freq}_{ci}$ represents the frequency setting of the core in question. The performance feasibility index therefore essentially indicates the number of instruction cycles available for the given frequency settings and/or performance states, and may render different scheduling results than a pure utilization value. From a strict performance perspective, the location where the workload is scheduled can be the processor with the highest performance feasibility index.

Accordingly, block 48' provides for determining a highest index among the plurality of indices at block 50 and assigning the workload to the core that corresponds to the highest index at block 52. Thus, returning to the example illustrated in FIGS. 2A-2C, it can be seen that the indices would result in the values shown in the following Table II.

TABLE II

| Core | Frequency | Availability | Index |
| --- | --- | --- | --- |
| Core_0 | 3600 | (1-90%) | 360 |
| Core_1 | 3600 | (1-20%) | 2880 |
| Core_2 | 2400 | (1-10%) | 2160 |
| Core_3 | 2400 | (1-20%) | 1920 |

Thus, although the third core 32 (Core_2) has the most "raw" availability, the additional workload would be assigned to the second core 28 (Core_1) because the second core 28 has the most number of instruction cycles available. Simply put, the workload can be assigned to a core that does not necessarily correspond to the highest availability.

As already noted, the feasibility performance indices could be calculated by software, microcode, fixed functionality hardware, etc., or any combination thereof. Software programming of OS implementation techniques are well documented and are not discussed further so as not to obscure the embodiments of the invention. Microcode programming is a technique for implementing the instruction set of a processor as a sequence of microcode instructions ("microinstructions"), where each of which typically includes a number of bit fields and the address of the next microinstruction to execute. Each bit field can control some specific part of the processor's operation, such as a gate which allows a functional unit to drive a performance feasibility index value onto a bus or a multiplication operation to be performed by the ALU. In the example illustrated in FIGS. 2A-2C, the computing system 23 includes a plurality of fixed functionality counters 54 (54a-54d) disposed within the cores 26, 28, 32, 34, to calculate the indices based on the frequency settings and readily available utilization data.

Accordingly, the above-described embodiments provide for concurrent improvement of performance and energy efficiency by taking into consideration relevant frequency information. In addition, lower power consumption can reduce ambient temperature in the system and lower temperatures can enable better reliability. Other advantages include reduced acoustics due to lower temperatures and simplified cooling systems (e.g., slower fan speeds).

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer-implemented method comprising:
    detecting a workload for a system having a first multi-core processor having a first processor core with a first performance indicator and a second multi-core processor having a second processor core with a second performance indicator, the first processor core sharing a first frequency setting with a first plurality of cores of the first multi-core processor and the second processor core sharing a second frequency setting with a second plurality of cores of the second multi-core processor; and
    scheduling the workload to a processor core that corresponds to a highest performance indicator, wherein the first and second performance indicators are calculated by multiplying a determined availability based on a utilization of each processor core by a corresponding frequency setting of each processor core.

2. The method of claim 1, wherein the scheduling includes scheduling the workload based on the corresponding frequency settings, wherein the corresponding frequency settings comprise a first frequency setting and a second frequency setting.

3. The method of claim 2, wherein scheduling the workload includes:
    determining the availability of the first processor core based on the utilization of the first processor core;
    calculating the first performance indicator based on the availability and the first frequency setting;
    repeating the determining and the calculating for the second processor core to obtain the second performance indicator; and
    scheduling the workload based on the first and second performance indicators.

4. The method of claim 3, wherein scheduling the workload includes:
    determining the highest performance indicator among the first and second performance indicators; and
    assigning the workload to a core that corresponds to the highest performance indicator.

5. The method of claim 1, wherein the scheduling includes scheduling the workload based on a first cache size and a second cache size.

6. An apparatus comprising:
    a first multi-core processor having a first processor core to have a first performance indicator, the first processor core to share a first frequency setting with a first plurality of cores of the first multi-core processor;
    a second multi-core processor having a second processor core to have a second performance indicator, the second processor core to share a second frequency setting with a second plurality of cores of the second multi-core processor; and
    scheduling logic to detect a workload for the apparatus and schedule the workload to a processor core that corresponds to a highest performance indicators, wherein the first and second performance indicators are calculated by multiplying a determined availability based on a utilization of each processor core by a corresponding frequency setting of each processor core.

7. The apparatus of claim 6, wherein the first performance indicator is to include a first frequency setting and the second performance indicator is to include a second frequency setting, and wherein the first and second frequency settings comprise the corresponding frequency settings of each processor core.

8. The apparatus of claim 7, wherein the scheduling logic is to determine the availability of the first processor core based on the utilization of the first processor core, calculate the first performance indicator based on the availability and the first frequency setting, repeat the determining and the calculating for the second processor core to obtain the second performance indicator and schedule the workload based on the first and second performance indicators.

9. The apparatus of claim 8, wherein the scheduling logic is to determine the highest performance indicator among the first and second performance indicators and assign the workload to a core that corresponds to the highest performance indicator.

10. The apparatus of claim 6, further including a plurality of counters, each counter being disposed within a processor core to multiply the availability by a corresponding frequency setting.

11. The apparatus of claim 6, wherein the scheduling logic is to schedule the workload based on a first cache size and a second cache size.

12. A system comprising:
a first socket coupled to a first processor, the first processor having a first plurality of cores and a first performance indicator that is shared by the first plurality of cores;
a second socket coupled to a second processor, the second processor having a second plurality of cores and a second performance indicator that is shared by the second plurality of cores; and
scheduling logic to detect a workload for the system and schedule the workload on a processor core that corresponds to a highest performance indicator, wherein the first and second performance indicators are calculated by multiplying a determined availability based on a utilization of each processor core by a corresponding frequency setting of each processor core.

13. The system of claim 12, wherein the first performance indicator is to include a first frequency setting and the second performance indicator is to include a second frequency setting, and wherein the first and second frequency settings comprise the corresponding frequency settings of each processor core.

14. The system of claim 13, wherein the scheduling logic is to determine an availability of each of the first and second plurality of cores based on utilizations of the first and second plurality of cores, calculate performance indicators based on the utilizations and the first and second frequency settings and schedule the workload based on the performance indicators.

15. The system of claim 14, wherein the scheduling logic is to determine the highest performance indicator among the first and second performance indicators and assign the workload to a core that corresponds to the highest performance indicator.

16. The system of claim 12, further including a plurality of counters, each counter being disposed within a core to multiply the availability by a corresponding frequency setting.

17. The system of claim 12, wherein the scheduling logic is to schedule the workload based on a first cache size and a second cache size.

18. An article comprising a memory containing instructions which if executed by one or more processors enable a system to:
detect a workload for a system having a first multi-core processor having a first processor core with a first performance indicator and a second multi-core processor having a second processor core with a second performance indicator, the first processor core sharing a first frequency setting with a first plurality of cores of the first multi-core processor and the second processor core sharing a second frequency setting with a second plurality of cores of the second multi-core processor; and
schedule the workload on a processor core that corresponds to a highest performance indicator, wherein the first and second performance indicators are calculated by multiplying a determined availability based on a utilization of each processor core by a corresponding frequency setting of each processor core.

19. The article of claim 18, comprising instructions that if executed enable the system to schedule the workload based on the corresponding frequency settings, wherein the corresponding frequency settings comprise a first frequency setting and a second frequency setting.

20. The article of claim 19, comprising instructions that if executed enable the system to:
determine the availability of the first processor core based on the utilization of the first processor core;
calculate the first performance indicator based on the availability and the first frequency setting;
repeat the determining and the calculating for the second processor core to obtain the second performance indicator; and
schedule the workload based on the first and second performance indicators.

21. The article of claim 18, comprising instructions that if executed enable the system to:
determine the highest performance indicator among the first and second performance indicators; and
assign the workload to a core that corresponds to the highest performance indicator.

22. The article of claim 18, comprising instructions that if executed enable the system to schedule the workload based on a first cache size and a second cache size.

23. A computer-implemented method comprising:
detecting a workload for a computing system having a first multi-core processor having a first processor core with a first performance indicator that includes a first frequency setting and a second multi-core processor having a second processor core with a second performance indicator that includes a second frequency setting, the first processor core sharing the first frequency setting with a first plurality of cores of the first multi-core processor and the second processor core sharing the second frequency setting with a second plurality of cores of the second multi-core processor;
determining the availability of the first processor core based on the utilization of the first processor core;
multiplying the availability by the first frequency setting to obtain the first performance indicator;
repeating the determining and the multiplying for the second processor core to obtain the second performance indicator;
determining a highest indicator among the first and second performance indicators; and
assigning the workload to a core that corresponds to the highest indicator.

24. The method of claim 23, further including using a plurality of counters to multiply the availabilities by the frequency settings.

* * * * *

UNITED STATES PATENT AND TRADEMARK OFFICE
CERTIFICATE OF CORRECTION

| | | |
|---|---|---|
| PATENT NO. | : 7,788,670 B2 | Page 1 of 1 |
| APPLICATION NO. | : 10/973707 | |
| DATED | : August 31, 2010 | |
| INVENTOR(S) | : Devadatta V. Bodas et al. | |

It is certified that error appears in the above-identified patent and that said Letters Patent is hereby corrected as shown below:

On Sheet 4 of 4, figure 5, in Reference Numeral 52, line 1, after "to" delete "to".

In column 6, line 51, in claim 6, delete "indicators," and insert -- indicator, --, therefor.

Signed and Sealed this

Twenty-third Day of November, 2010

David J. Kappos
*Director of the United States Patent and Trademark Office*